Aug. 18, 1936.    C. H. NORDELL    2,051,149
SETTLING TANK
Filed May 21, 1934    2 Sheets-Sheet 1
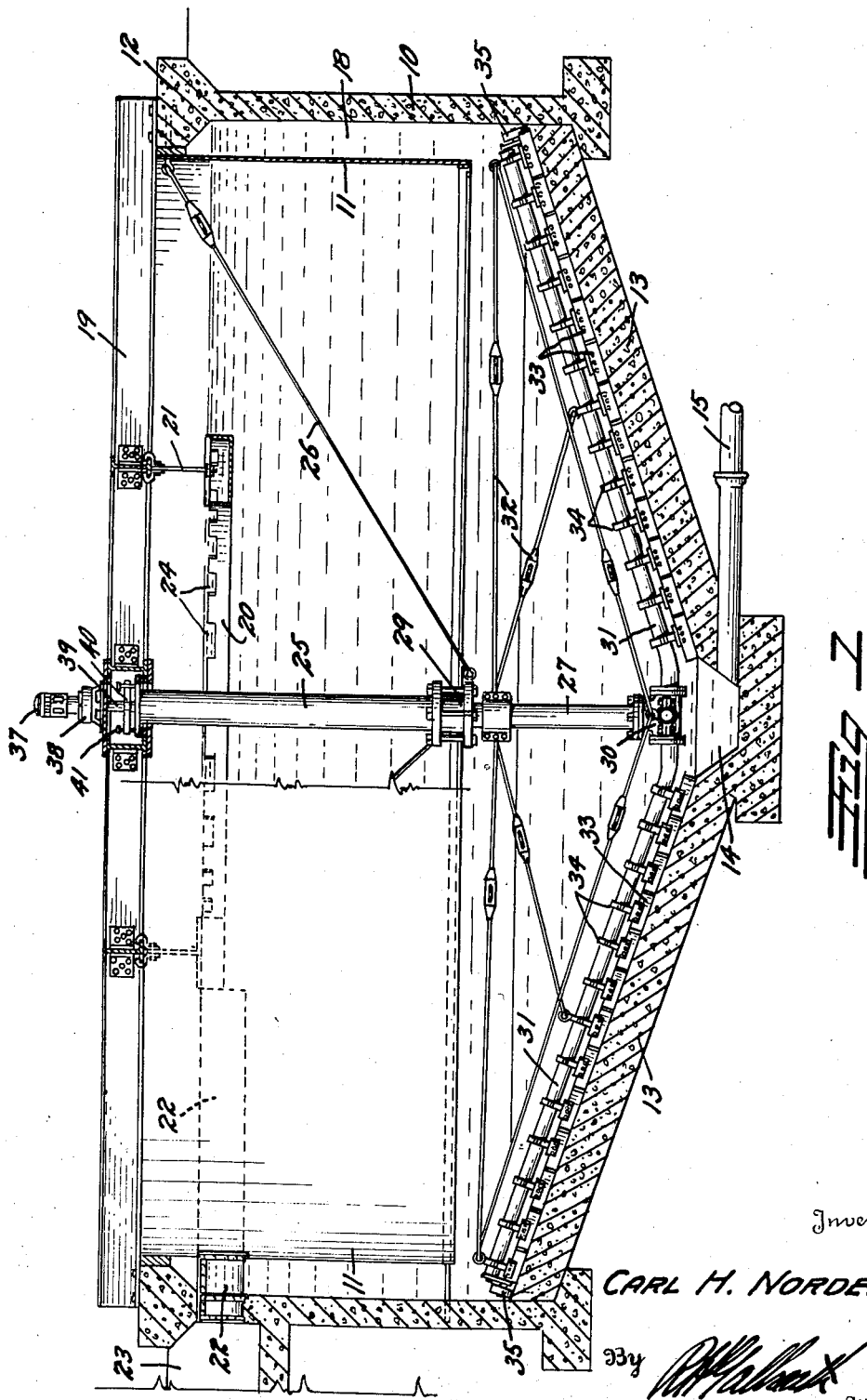
Inventor
CARL H. NORDELL Aug. 18, 1936.   C. H. NORDELL   2,051,149
SETTLING TANK
Filed May 21, 1934   2 Sheets—Sheet 2
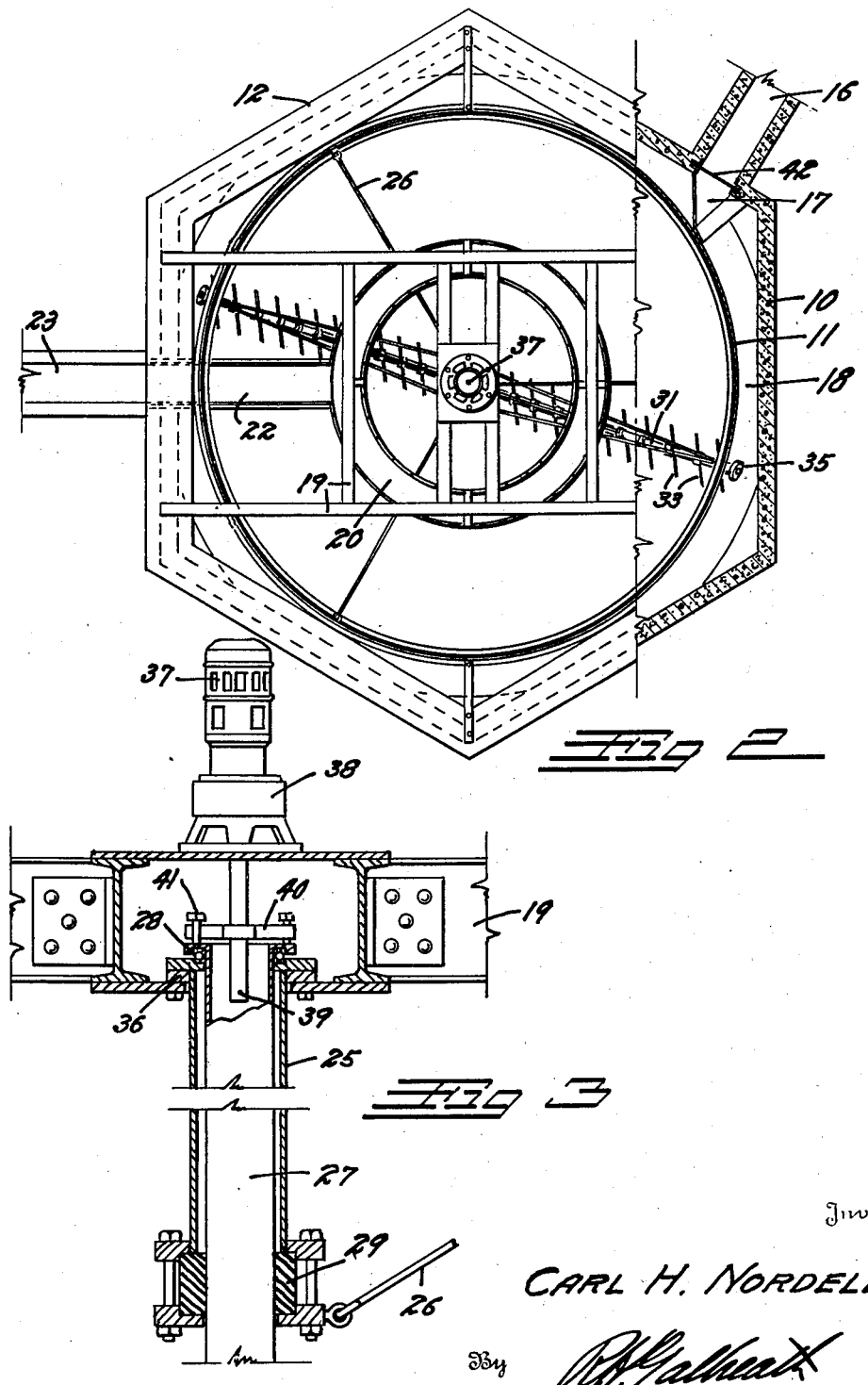
Inventor
CARL H. NORDELL
By
Attorney Patented Aug. 18, 1936

2,051,149

UNITED STATES PATENT OFFICE 2,051,149

SETTLING TANK

Carl H. Nordell, Chicago, Ill., assignor to Lakeside Engineering Corporation, Chicago, Ill.

Application May 21, 1934, Serial No. 726,684

4 Claims. (Cl. 210—3)

This invention relates to a settling tank, more particularly designed for settling sewage although of course not limited to this particular use. In the conventional type of settling tank, the sewage flows directly across the tank. The current thereby created and the currents created by the movement of the sludge collectors set up countercurrents causing persistent whirls. These whirls collect and form more or less permanent "clouds" of sludge which greatly interfere with the settling and the general efficiency of the tank.

The principal object of the present invention is to provide a settling tank which will have a harmonious and coordinated flow so as to eliminate these whirls, and their resultant clouds so as to constantly maintain a high efficiency in the tank.

Another object of the invention is to so construct the tank that its settling coefficiency will be independent of the amount of, or the variations in, the incoming solution.

A further object is to so construct the mechanical portions of the device that they will be long wearing, will require but a minimum of attention and but a minimum of power.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a vertical cross section through a tank in which the invention is embodied.

Fig. 2 is a plan view thereof, partly in section.

Fig. 3 is a detail section of the central shaft thereof.

The invention comprises a settling basin or tank 10, preferably formed of concrete with a hexagonal shape. The walls of the tank 10 are surmounted by a beam section 12 which projects both inwardly and outwardly beyond the wall faces so as to increase the thickness thereof at the top. The tank is provided with a conical bottom 13 inclining to a sludge pocket 14 at the center thereof. A sludge draw-off pipe 15 leads from the pocket 14. The beam section 12 increases the strength of the tank, provides a walkway about the tank, and provides means for suspending a cylindrical baffle 11 within the tank. The baffle 11 extends entirely around the tank 10 terminating a short distance above the bottom 13.

The solution to be settled is fed into the tank 10 through an influent channel 16 which preferably enters the tank tangentially of the baffle wall 11. However if this is not convenient, it may be led directly through the wall, as illustrated, and discharged through a tangentially arranged baffle hood 17 which will direct the flow tangentially of the baffle wall 11.

It will be noted that the overhang of the beam section 12 provides a peripheral space between the baffle wall 11 and the tank walls entirely around the baffle which will be herein designated as the race 18. This race constantly changes its width, owing to the relative differences between the circular baffle and the hexagonal tank.

A structural superstructure 19 extends across the top of the tank 10 and supports an annular weir ring 20 therein substantially at the solution level. The weir ring is suspended by means of suitable hangers 21 from the super-structure and communicates with an effluent trough 22 which leads through the baffle 11 and the wall of the tank 10 to an effluent channel 23. The side walls of the weir ring are provided with a series of similar flat-bottomed notches 24, each of which forms a weir over which the solution flows into the weir ring.

The superstructure 19 supports at the center of the tank 10 a vertical shaft housing 25 which is maintained in a vertical position by means of suitable tie-rods 26. A tubular main shaft 27 extends downwardly within the shaft housing 25 and is supported therein on a thrust bearing 28 at the top. A steady bearing 29 of rubber, wood or other suitable material is placed at the bottom of the shaft housing to absorb lateral strains on the shaft 27.

The shaft 27 terminates at its bottom in a T-fitting 30 from which extend two oppositely positioned, inclined, scraper arms 31 which are supported and braced from the shaft 27 by means of suitable tie-rods 32. A series of flat, sheet metal plows 33 are secured in spaced relation throughout the length of the scraper arms 31 by means of suitable clamps 34. The scrapers or plows are set at an angle which will carry material downwardly along the bottom 13 to the sludge pocket 14. The outer extremities of the scraper arms 31 are preferably supported upon wheels 35 so that they will maintain a uniform distance from the bottom 13. The axial portion of the arms may be adjusted up or down to maintain this distance uniform by means of a suitable spacer 36 beneath the thrust bearing 28.

The shaft 27 is rotated from a suitable motor 37 through a speed reducer 38 from which a drive shaft 39 extends. The speed reducer shaft 39 drives an armed spider 40, the arms of which contact with shear pins 41 projecting upwardly from the main shaft 27. Therefore should an abnormal load be placed upon the shaft, the pins will bend or shear off so as to prevent damage to the motor.

Operation

The influent is controlled by means of a suitable stop gate 42 so that it will have substantially the same velocity as the vortex current caused by the rotating scraper arms 31 which rotate in the same tangential direction. Thus a slow downward spiral movement is imparted to the influent in the race 18, and, as the mixture of sludge and sewage strikes the corners of the tank, there is a gentle mixing action which greatly aids in flocculation. The sewage flows beneath the baffle 11 in a tangential direction and rises to the weir ring 20 in a gentle contracting spiral.

There are two distinct hydraulic motions in the settling compartment, the very slow upward flow to the weir ring 20, and the faster rotary flow produced by the method of introducing the sewage and the action of the rotating scraper arms. These movements are at right angles to each other and do not interfere to cause counter currents or "clouds" of sludge as in the usual machine. The rotary flow has the same direction and substantially the same velocity as the scraper arms 31, hence the motion of the sludge scraper arms, and effluent, are so synchronized that turbulence and the formation of "clouds" is avoided and a high settling efficiency is obtained.

Since the thrusted bearing 28 is far above the solution line, it can be efficiently lubricated. The steady bearing 29 needs no lubrication other than that obtained from the sewage itself.

While the tank 10 is illustrated as hexagonal, which is probably the preferable shape, it need not, of course be always a hexagon since any shape which would provide an annular series of flat sides would serve the purpose of the invention.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A settling device comprising: a hexagonal tank; a conical bottom in said tank; means for removing material from the lowest point of said bottom; a cylindrical baffle member extending into said tank in spaced relation with the walls and bottom thereof; an annular, channel-like, weir ring suspended substantially at the solution line within said baffle member; means for conducting solution from said ring through the wall of said tank; and means for supplying solution to the space between said walls and said baffle member, said latter means being arranged to deliver said incoming solution tangentially of said baffle member.

2. A settling device comprising: a hexagonal tank; a conical bottom in said tank; means for removing material from the lowest point of said bottom; a cylindrical baffle member extending into said tank in spaced relation with the walls and bottom thereof; an annular, channel-like weir ring suspended substantially at the solution line within said baffle member; means for conducting solution from said ring through the wall of said tank; means for supplying solution to the space between said walls and said baffle member; a superstructure extending over said tank; a vertical, shaft housing suspended from said structure within said tank; a vertical shaft within said housing terminating adjacent the bottom of said tank; and scraper arms extending from said shaft and provided with rakes to rake material toward the low point of said bottom.

3. A settling device comprising: a hexagonal tank; a conical bottom in said tank; means for removing material from the lowest point of said bottom; a cylindrical baffle member extending into said tank in spaced relation with the walls and bottom thereof; an annular, channel-like, weir ring suspended substantially at the solution line within said baffle member; means for conducting solution from said ring through the wall of said tank; and means for supplying solution to the space between said walls and said baffle member; an inwardly projecting beam along the top of the walls of said tank, said beam acting as a spacer and a support for said baffle member.

4. In a settling tank: means for receiving the overflow of said tank comprising: an annular channel member suspended substantially at the solution line of said tank; a series of weirs formed in the walls of said channel member; and a conduit for receiving the contents of said channel member.

CARL H. NORDELL.